United States Patent [19]

Kagan et al.

[11] Patent Number: 5,922,378

[45] Date of Patent: Jul. 13, 1999

[54] WATER FILTRATION VESSEL

[76] Inventors: Michael Kagan, 8 Gideon Street; Ian Solomon, 10 Shlomo Zemach St.; Yehuda Vatkin, 43 Rachel Imenu St., all of Jerusalem, Israel

[21] Appl. No.: 08/978,654

[22] Filed: Nov. 26, 1997

[51] Int. Cl.[6] .............................. A21D 10/02; A23P 1/00
[52] U.S. Cl. .......................... 426/132; 426/72; 426/74; 426/495; 210/348; 210/416.3; 210/455
[58] Field of Search .................... 210/464, 467, 210/468, 473, 477, 348, 416.3, 455; 426/433–435, 132, 77, 74, 78, 79, 495, 422, 72; 99/295, 316, 323

[56] References Cited

U.S. PATENT DOCUMENTS

| | | | |
|---|---|---|---|
| 4,695,379 | 9/1987 | Nohren, Jr. et al. | 210/282 |
| 4,769,144 | 9/1988 | Nohren, Jr. | 210/282 |
| 4,979,654 | 12/1990 | Nohren, Jr. | 222/482 |
| 5,198,114 | 3/1993 | Lewis et al. | 210/610 |
| 5,211,973 | 5/1993 | Nohren, Jr. | 426/82 |

*Primary Examiner*—Anthony J. Weier
*Attorney, Agent, or Firm*—Brown, Martin, Haller & McClain, LLP

[57] ABSTRACT

The invention provides a water filtration vessel of the type having an upper reservoir for receiving tap water, a lower reservoir for storing filtered water and a filter-retaining passageway connecting between the upper and the lower reservoirs, further having a dispenser, mounted in communication with the lower reservoir for controllably adding a prequantified amount of a comestible additive to the filtered water.

18 Claims, 3 Drawing Sheets

WATER FILTRATION VESSEL

BACKGROUND TO THE INVENTION

The present invention relates to a water filtration vessel. More particularly the present invention relates to a water filtration vessel incorporating a dispenser for a comestible additive.

Public perception of the poor quality and taste of regular tap water has led to the development and sale of a number of products addressing these problems. Particular problems in tap water include the taste and smell of chlorine, water hardness due to calcium carbonate and the presence of dirt or other particulate matter. Products designed to deal with this problem include bottled or mineral waters and various water-filtration devices. Bottled water is typically both chlorine-free and mineral-enriched, but it is relatively expensive in comparison to filtered tap water. Filtered tap water provides an inexpensive route to obtaining particulate- and chlorine-free water. Most home water-filtration systems use a filter-cartridge containing either activated carbon or a combination of activated carbon and an ion-exchange resin. The activated carbon serves to filter out dirt and other impurities, while eliminating most of the chlorine present in the water. The ion-exchange resin removes positive ions such as calcium, thereby softening the water. A negative side-effect of the above-mentioned systems is that various other healthy minerals are removed by the ion-exchange resin. An alternative method of water purification is reverse osmosis, but products using this technology are not widely utilized by household consumers.

Home water-filtration systems thus consist primarily of activated carbon based filters, and these are available in two configurations: a) in-line filters where the intake of the filter system is connected to a household water pipe or faucet, and b) fillable water filters such as jug-filters where a reservoir at the top of the filter is filled manually by the user, where the water then percolates through a filter-cartridge to the lower reservoir. In both of the above configurations, the water issued at the outlet of the filter is typically poorer in mineral content (or, at best, has the same mineral content) than the tap water at the intake.

The issue of enhancement of the quality of the issued water from a mineral/supplement viewpoint has been addressed in U.S. Pat. No. 5,198,114 by Michaels et. al., which describes the use of dolomite mixed with the activated carbon in the filter cartridge so as to achieve two objectives: preventing the growth of harmful bacteria, and adding both magnesium and calcium as dietary supplements.

U.S. Pat. No. 5,211,973 by Nohren describes the use of two cartridges placed in series, where the former serves to purify the water using activated carbon and the like, and a subsequent cartridge leaches minerals, flavorings or vitamin supplements into the water as it percolates through this subsequent cartridge on its way to the outlet.

Both of the above patents are disadvantageous in that they depend, for their effective operation, on the solubilization of the minerals and supplements in the water as it percolates through the filtration system. This solubility depends in turn on the flow-rate and temperature of the water percolating through the above-mentioned cartridges, in addition to the arrangement of media in the cartridge itself. Thus, while using such a system, it is difficult to control the quantity and composition of the minerals or supplements that are being added. Additionally, many useful health supplements are not rapidly dissolved in water, so the upper limits of supplement addition are rapidly encountered using such an approach.

The practice of intaking diet supplements has become wide-spread around the world, however some people take high doses of vitamins without consulting a doctor or a professional nutritionist. The result of overconsumption of diet supplements has recently been linked to various health problems. For example, beta-carotene was, and probably still is, consumed in excess by some smokers who believe that this vitamin provides protection against cancer. Certain elements, such as calcium, iron, zinc and selenium are known to be beneficial in small doses, but when consumed in excess may cause additional health problems. For example excessive consumption of zinc causes gastrointestinal irritation and impaired immune function.

It is therefore the intention of the present inventors to obviate the shortcomings of the above-mentioned solutions by providing a water filtration vessel which provides a controlled quantity of desirable supplements and is thus likely to discourage excessive consumption of minerals and vitamins.

SUMMARY OF THE INVENTION

It is therefore the object of the present invention to provide a water filtration vessel of the type having an upper reservoir for receiving water, a lower reservoir for storing filtered water and a filter-retaining passageway connecting between said upper and said lower reservoirs, further comprising a dispenser, mounted in communication with said lower reservoir for controllably adding a prequantified amount of a comestible additive to said filtered water.

In a preferred embodiment of the present invention said dispenser includes a pump mechanism and wherein each actuation of said pump introduces a prequantified amount of said comestible additive to said filtered water.

In preferred embodiments of the present invention said comestible additive is a dietary supplement.

In a further preferred embodiment of the present invention said dietary supplement is in liquid form.

In another aspect of the invention said dietary supplement is in dissolvable tablet form.

In an even further preferred embodiment of the present invention said dietary supplement includes a plurality of minerals, wherein said minerals include metal ions selected from the group consisting of calcium, magnesium, potassium, sodium, selenium, zinc, iron, manganese and mixtures thereof.

In a still further preferred embodiment said dietary supplement includes at least one vitamin, wherein said vitamin is selected from the group consisting of vitamin B12, vitamin C and mixtures thereof.

Homeopathic remedies and herbal remedies, as well as flavorings, may also be included in the controlled dispenser of the present invention.

The present invention also provides a vessel wherein said dispenser includes a replaceable cartridge containing between about 30 and 150 cc of liquid supplement. Said vessel is provided with an upper reservoir with a capacity of about 1 liter and wherein said predetermined quantified amount is about 0.5 cc of liquid dietary supplement to be added to said lower reservoir before the refilling of said upper reservoir.

As stated hereinbefore, in U.S. Pat. No. 5,211,973 there is described and claimed a water treatment apparatus which includes a replaceable filter cartridge for attachment to the lower end of a water treatment elongated tube, said cartridge containing one or more of filter media, flavoring concentrates and/or minerals or vitamin supplements. Said apparatus, however, suffers from the disadvantage that it is based on materials which leach components into the water after they have passed through the water treatment tube, and therefore the amount of materials introduced cannot be predetermined and are subject to fluctuations in flow-rate and environmental factors such as temperature of the water flowing through said cartridge.

As will be realized, in contradistinction to the teachings of said patent, the present invention enables the exact release of prequantified aliquot quantities of supplements per quantity of filtered water, irrespective of the temperature or flow rate of the water through the filtration system.

The present invention also enables, pursuant to a user decision, a change in the relative amount of supplements added per quantity of filtered water without requiring any changes in the system configuration.

As will be realized, the present invention provides an integrated home water-filter vessel which produces water that is both filtered and enhanced with minerals and/or other supplements. In a preferred embodiment of the vessel, the mechanism which enables the controlled addition of the water-soluble minerals and/or supplements is a miniature pump built into said dispenser. Each depression of said pump introduces a predetermined volume of the water-soluble minerals and/or supplements located within the dispenser unit into the filtered water. In a preferred embodiment of the present invention, one depression of the dispenser's pump is performed prior to each filling of the upper reservoir, and the quantity of minerals and/or supplements thus administered is a known fraction, typically 1/2000, of the volume of the upper reservoir.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
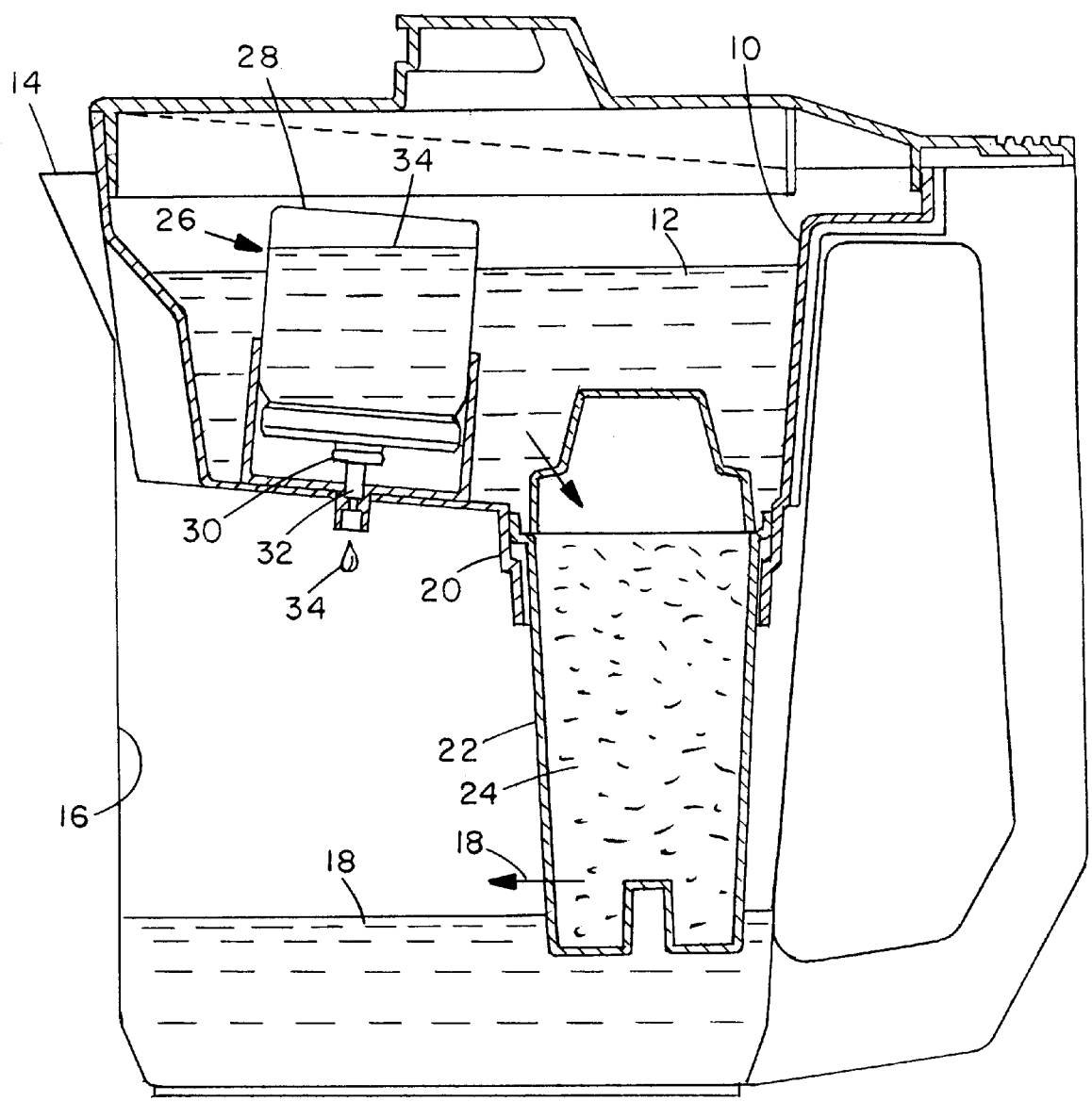
FIG. 1 shows an elevational sectional view of a jug-type water-filter vessel with the supplement dispenser held on a floor/ceiling dividing the upper and lower reservoirs.

An exemplary water-filtration vessel according to the present invention is shown in FIG. 1.

An upper reservoir 10 for receiving tap water 12 occupies the upper portion of a jug vessel 14. A lower reservoir 16 for receiving and storing filtered water 18 occupies the lower portion of vessel 14. A filter-retaining passageway 20 connects between the upper and lower reservoirs 10, 16. Passageway 20 leads through a replaceable filter cartridge 22, the contents 24 thereof typically comprising either activated carbon, or some combination of activated carbon together with an ion-exchange resin. The filter 22 and contents 24 remove chlorine, organic matter, and particulates. Filter cartridge 22 fits closely into passageway 20, thus that only filtered water proceeds to the stage of mixing with the minerals/supplements provided by the dispenser 26.

A dispenser 26 comprises a container 28 and a miniature pump 30, the pump outlet 32 being in fluid communication with lower reservoir 16 for adding a prequantified amount of a comestible additive 34 to filtered water 18.

The mineralization and/or other supplementation effect is due to the manual pushing of dispenser 26 which in turn operates pump 30 when being depressed. Each depression and subsequent spring return introduces a predetermined quantified amount of a comestible additive 34 to filtered water 18.

The pump 30 is in the present embodiment an integral part of replaceable a comestible additive container 28, and is thus disposed of together with exhausted dispenser 26.

Advantageously a comestible additive 34 is in liquid form. A fixed relationship is maintained between the volume of filtered water 18 input to the lower reservoir 16 and the amount of aqueous minerals and/or supplements 34 added, by specifying that a given number of depressions of the container 28 is required per filling of the upper reservoir 10. Due to the fact that the minerals and/or supplements 34 are already in aqueous solution in the container, factors such as variations in room or refrigerator temperature and the rate of flow of the water through the water-filter cartridge do not interfere with the delivery of the required dosage relationship.

Nevertheless certain comestible additive materials may be more conveniently dispensed in dissolvable tablet form, for which purpose the pump 30 is replaced by a tablet feed device (not shown).

A comestible additive 34 intended as a mineral supplement advantageously includes a plurality of minerals, for example metal ions selected from the group consisting of calcium, magnesium, potassium, sodium and mixtures thereof. Advantageously, the a comestible additive 34 is formulated so that the following total approximate doses per liter of drinking water are produced in the lower water reservoir: Calcium 26 mg/liter, magnesium 18 mg/liter, potassium 3.5 mg/liter and sodium 32 mg/liter. The resulting water is substantially equivalent to mineral water available from bottled and natural mineral water sources.

Alternatively, a comestible additive intended as a health supplement could advantageously provide a plurality of minerals for example metal ions selected from the group consisting of calcium, selenium, magnesium, potassium, zinc, copper, iron, chromium and manganese formulated so that the following total approximate doses per liter of drinking water are produced in the lower water reservoir: calcium 39 mg/liter, magnesium 23 mg/liter, selenium 0.3 mg/liter, potassium 0.007 mg/liter and zinc, copper, iron, chromium and manganese 0.004 mg/liter.

Further desirable additions are vitamins, such as vitamin B12, vitamin C and mixtures thereof.

Further options for the a comestible additive 34 include a homeopathic remedy, for example arsenicum album which is beneficial to the immune system and combats anxiety and improves digestion. A further example is bryonia, which combats lack of energy.

Herbal remedies can also be added to the a comestible additive 34. Examples are Motherwort (*Leonarus cardiaca*) which is a general tonic and calms the nervous system, and Lime flowers (*Tilia europeae*) which also calms the nerves, and soothes the stomach.

In addition, flavorings such as lemon, mint, etc., can be included in the comestible additive.

A typical dispenser 26 holds between about 30 and 150 cc of a liquid comestible additive 34.

A convenient size for home use is for the upper reservoir 10 to have a capacity of about 1 liter. For such size the predetermined quantified amount of a comestible additive 34 is about 0.5 cc, which is added to lower reservoir 16 before the refilling of upper reservoir 10.

The advantages of this device will be readily apparent; first contaminants are removed from the tap water 12 and then a controlled amount of presolubilized minerals and/or supplements 34 are introduced to the filtered water 18.

The two operations, filtration and supplementation, are independent and parallel functions.

In the following figures similar numbers are used to designate similar parts.

Figure 2:
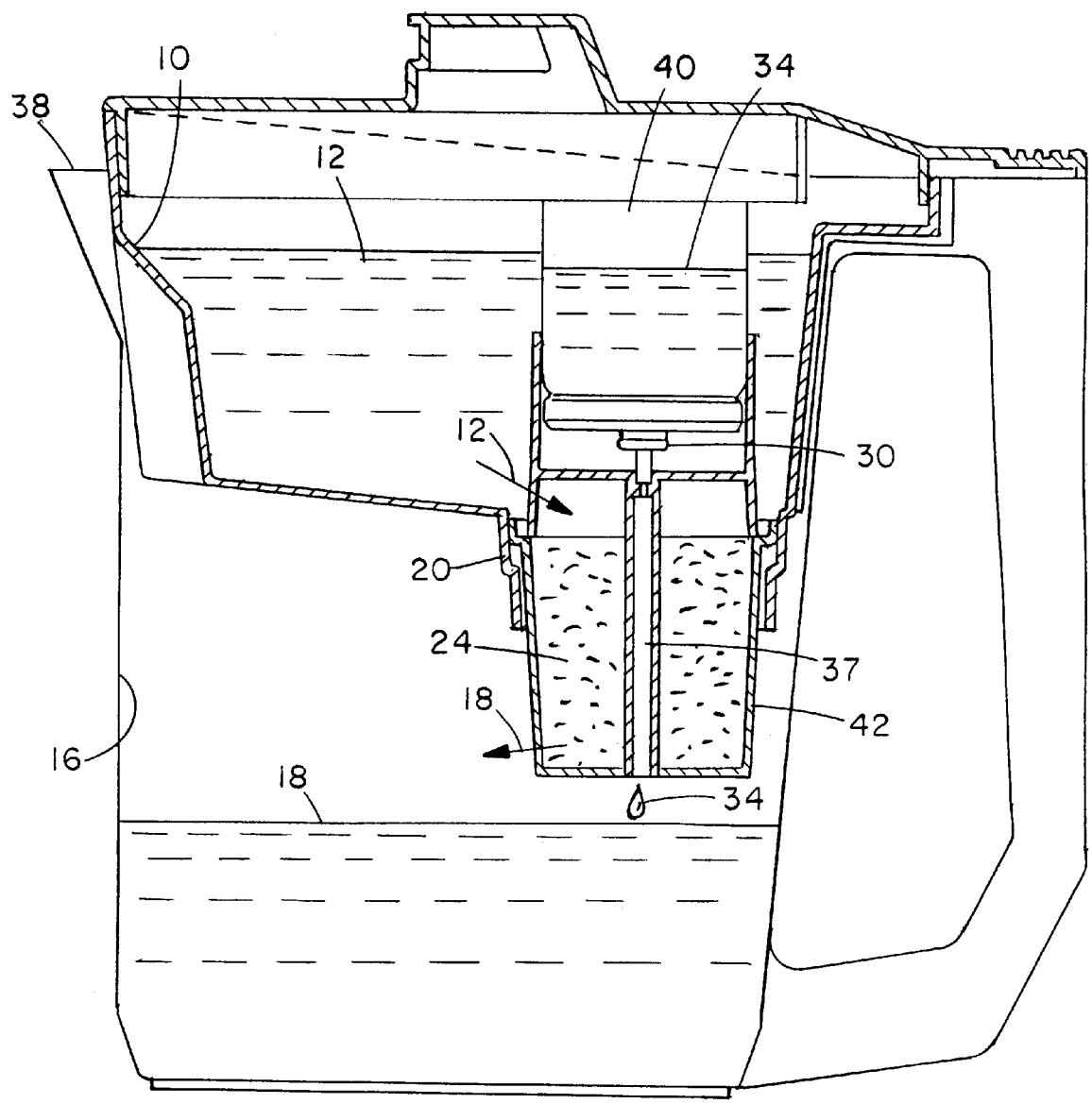
FIG. 2 shows an elevational sectional view of a jug-type water-filter vessel with the supplement dispenser held over the filter cartridge.

Referring now to FIG. 2, there is seen an exemplary embodiment of the mineral type water-filter vessel 38 with the supplement dispenser 40 held over the filter cartridge 42.

Otherwise the present embodiment 38 is similar to the vessel 14 described with reference to FIG. 1.

In the present embodiment the dispenser 40 and the filter-cartridge 42 are merged physically into one unit so as to provide an advantage as regards ease of installation; however the principle of parallel dispensing of soluble supplements 34 remains the same since the comestible additive is introduced through pipe 37 directly into the lower reservoir 16. Filter cartridge 42 is smaller than the filter cartridge 22 shown in FIG. 1, as there is assurance of its replacement when the a comestible additive 34 is exhausted.

Figure 3:
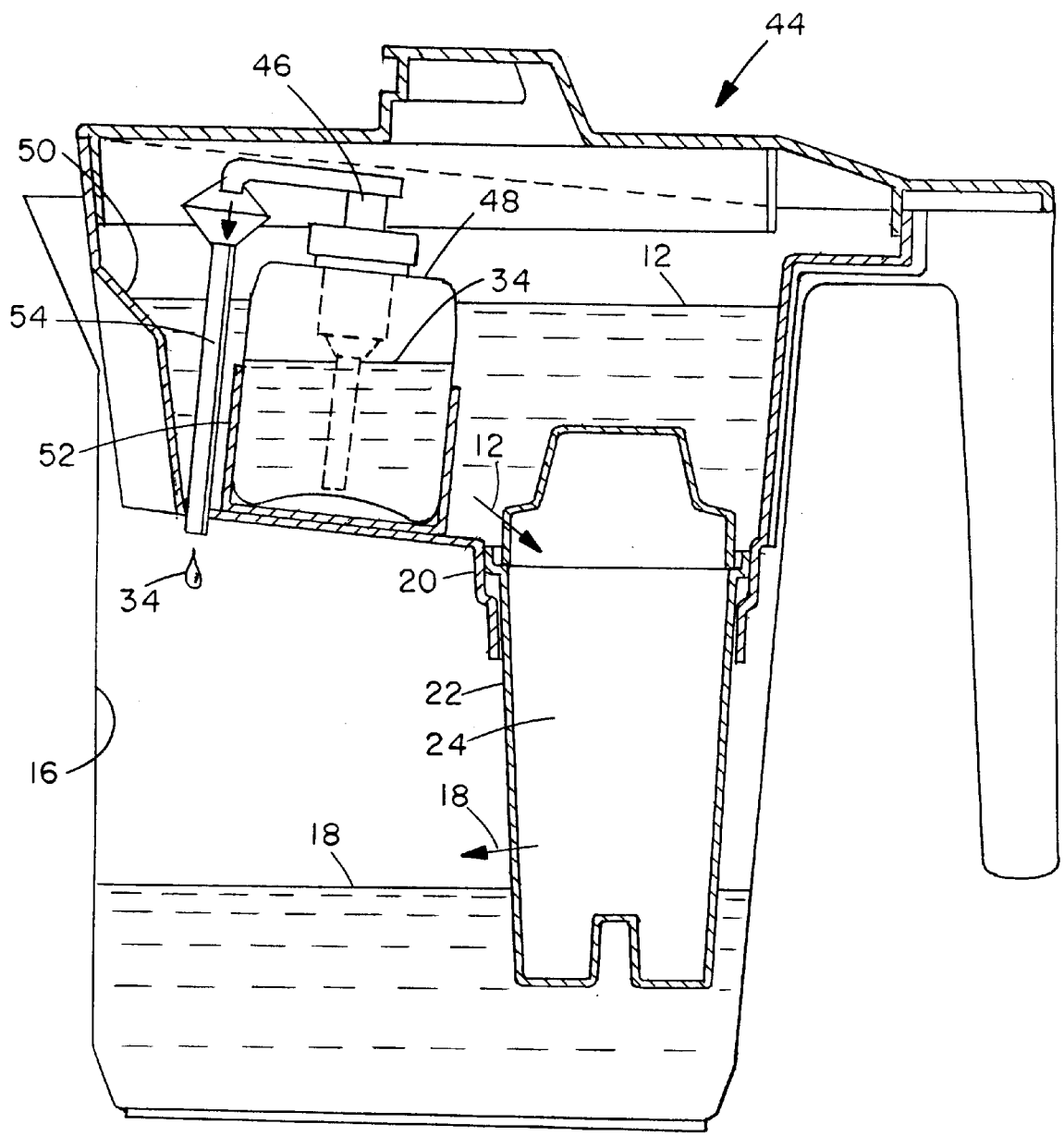
FIG. 3 shows an elevational sectional view of an embodiment of the dispenser filtration vessel wherein said dispenser includes a pump mechanism having a manually operated actuating lever.

A further exemplary embodiment 44 of the present invention is shown in FIG. 3.

The embodiment 44 is similar to that described with reference to FIG. 1, except that the pump mechanism 46 may be reused, and need not be disposed of together with an exhausted comestible additive container 48.

It should be noted that the design of the present embodiment 44 is particularly advantageous in ensuring that there is no possible leakage of tap water 12 from the upper reservoir 50, via an outlet for the dispensing device, to the lower reservoir 16. Each dose of comestible additive 34 discharged from pump mechanism 46 is transferred to lower reservoir 16 through a tube 54.

The replaceable dispenser container 48 is, of course, easily removed when its contents 34 are exhausted, and a new container 48 is inserted.

Advantageously the dispenser pump mechanism 46 provides indication of the need to recharge dietary supplement container 48.

In a preferred embodiment, both the sound issued by the pump mechanism 46 and the tactile feel for the finger depressing the same will be significantly different when the comestible additive container's contents are exhausted; thus providing feedback to the user that it is time to replace the dispenser cartridge.

It will be understood that an aerosol pressurized container (not shown) provides an alternative method of dispensing a dose of the comestible additive into the filtered water held in the lower reservoir.

A further exemplary integrated water-filtration and supplementation system (not shown) according to the present invention comprises the same functional components as described above, but with the difference that the water-filtration system is either a large counter-mounted unit or a free-standing unit such as a water cooler, or drinking fountain. In these examples the volumes of upper and lower reservoirs are larger than in a jug-filter and thus the number of depressions of the plunger required per filling may also be larger. Alternatively, the volume released by each depression of the plunger is set to be appropriate for the larger volume of water per filling in such a larger configuration.

It will thus be seen that according to the present invention a simple and accurate means of providing water that is both filtered and mineralized and/or supplemented has been provided for household or office use. While the invention has been shown herein in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A water filtration vessel having an upper reservoir for receiving water, a lower reservoir for storing filtered water and a filter-retaining passageway connecting between said upper and said lower reservoirs, further comprising a dispenser, mounted in communication with said lower reservoir for controllably adding a predetermined quantified amount of a comestible additive to said filtered water, wherein a fixed relationship is maintained between the volume of filtered water input to said lower reservoir and the amount of comestible additive added with each actuation of said dispenser.

2. A water filtration vessel having an upper reservoir for receiving water, a lower reservoir for storing filtered water and a filter-retaining passageway connecting between said upper and said lower reservoirs, further comprising a dispenser, mounted in communication with said lower reservoir for controllably adding predetermined quantified amounts of a comestible additive to said filtered water, wherein said dispenser includes a pump mechanism and wherein each actuation of said pump introduces a prequantified amount of said comestible additive to said filtered water.

3. A water filtration vessel according to claim 1, wherein said comestible additive is in liquid form.

4. A water filtration vessel according to claim 1, wherein said comestible additive is in dissolvable tablet form.

5. A water filtration vessel according to claim 1, wherein said comestible additive is a dietary supplement.

6. A water filtration vessel according to claim 5, wherein said dietary supplement includes a plurality of minerals.

7. A water filtration vessel according to claim 6, wherein said minerals include metal ions, the metal being selected from the group consisting of calcium, magnesium, potassium, sodium, selenium, zinc, iron, manganese and mixtures thereof.

8. A water filtration vessel according to claim 5, wherein said dietary supplement includes at least one vitamin.

9. A water filtration vessel according to claim 8, wherein said vitamin is selected from the group consisting of vitamin B12, vitamin C and mixtures thereof.

10. A water filtration vessel according to claim 5, wherein said dietary supplements includes a homeopathic remedy.

11. A water filtration vessel according to claim 5, wherein said dietary supplement includes a herbal remedy.

12. A water filtration vessel according to claim 1, wherein said comestible additive is a food flavoring.

13. A water filtration vessel according to claim 1, wherein said dispenser includes a replaceable cartridge containing between about 30 and 150 cc of a liquid comestible additive.

14. A water filtration vessel according to claim 13, wherein said dispenser is an integral part of said replaceable cartridge.

15. A water filtration vessel according to claim 1 having an upper reservoir with a capacity of about 1 liter and wherein said predetermined quantified amount is about 0.5 cc of liquid dietary supplement to be added to said lower reservoir before the refilling of said upper reservoir.

16. A water filtration vessel according to claim 2, wherein said pump is provided with means for indicating when said additive has been depleted.

17. A water filtration vessel having an upper reservoir for receiving water, a lower reservoir for storing filtered water and a filter-retaining passageway connecting between said upper and said lower reservoirs, further comprising a dispenser, mounted in communication with said lower reservoir for controllably adding prequantified aliquot quantities of a comestible additive to said filtered water with each actuation of said dispenser, irrespective of the temperature or flow rate of the water through the filtration vessel.

18. A water filtration vessel having an upper reservoir for receiving water, a lower reservoir for storing filtered water and a filter-retaining passageway connecting between said upper and said lower reservoirs, further comprising a manually operated dispenser, mounted in communication with said lower reservoir for controllably adding prequantified aliquot quantities of a comestible additive to said filtered water with each actuation of said dispenser.

* * * * *